United States Patent [19]
Ratcliff

[11] 3,740,088
[45] June 19, 1973

[54] TELESCOPIC END SECTION FOR TELESCOPIC TRAVEL TRAILER

[76] Inventor: John W. Ratcliff, R.R. 1, Marengo, Ill. 60152

[22] Filed: Jan. 10, 1972

[21] Appl. No.: 216,706

Related U.S. Application Data

[63] Continuation of Ser. No. 68,071, Aug. 31, 1970, abandoned.

[52] U.S. Cl. .................. 296/23 C, 296/26, 52/66
[51] Int. Cl. ............................................. B60p 3/32
[58] Field of Search ............... 296/23 C, 23 R, 26, 296/27; 52/66

[56] References Cited
UNITED STATES PATENTS

| | | | |
|---|---|---|---|
| 1,436,984 | 11/1922 | Follett | 296/26 |
| 2,756,094 | 7/1956 | Marple | 296/23 C |

Primary Examiner—Philip Goodman
Attorney—Andrus, Sceales, Starke & Sawall

[57] ABSTRACT

A telescopic travel trailer having telescopic end sections. The trailer includes an upper trailer section disposed to telescope vertically with respect to a lower trailer section from a retracted lower position for transporting to an extended upper position for camping. End sections are mounted for sliding movement on the open-ended upper trailer section and each end section telescopes horizontally between a retracted inner position and an extended outer position. A horizontal shelf is located within each end section, and in its lower position serves as a bunk. The shelf can be moved above the level of the upper trailer section so that the telescopic end section can be moved to the retracted inner position for traveling.

11 Claims, 6 Drawing Figures

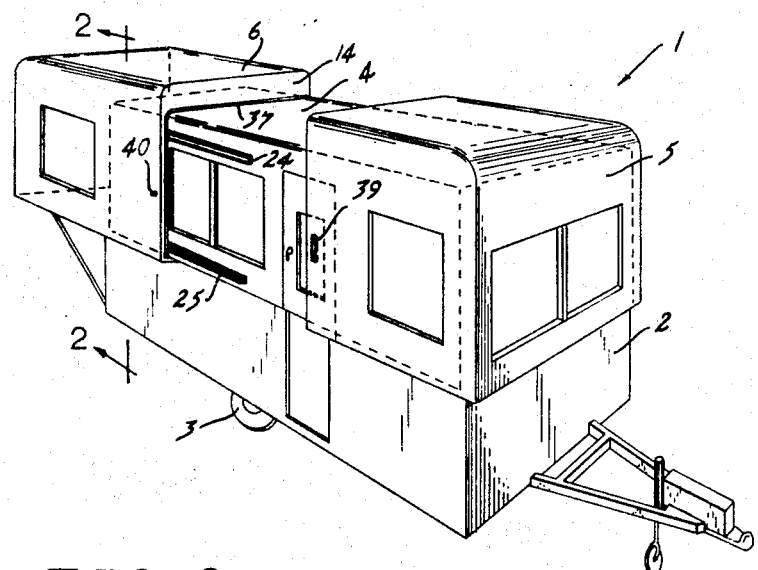
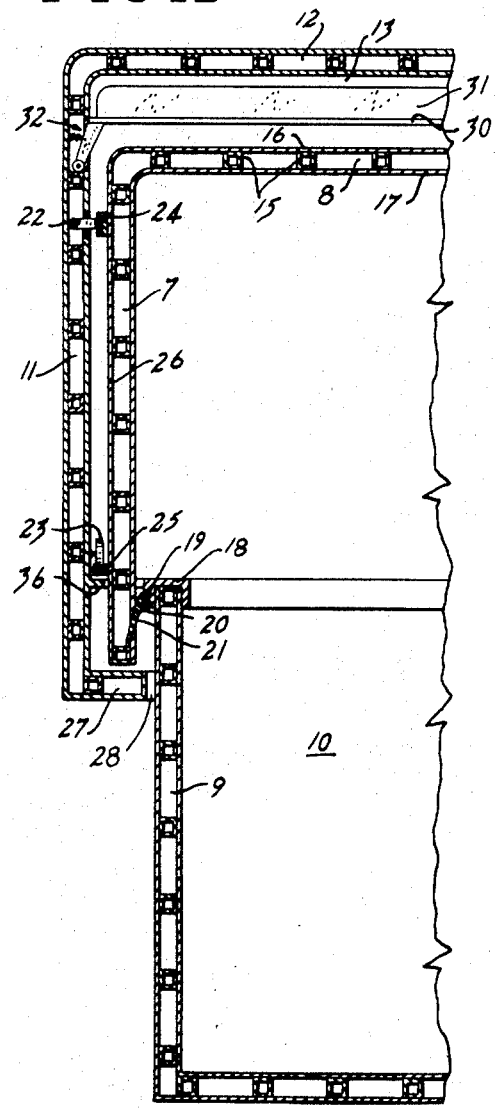
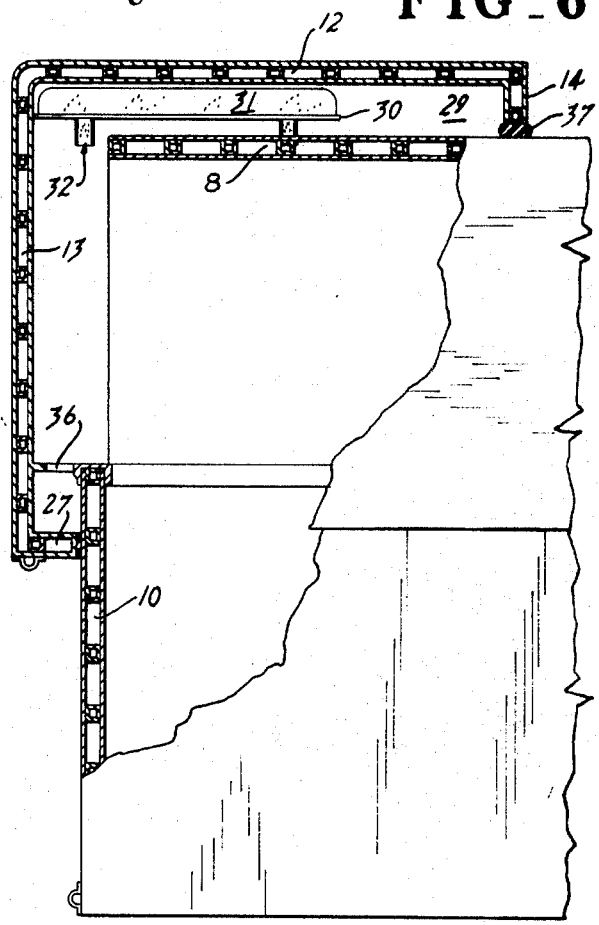

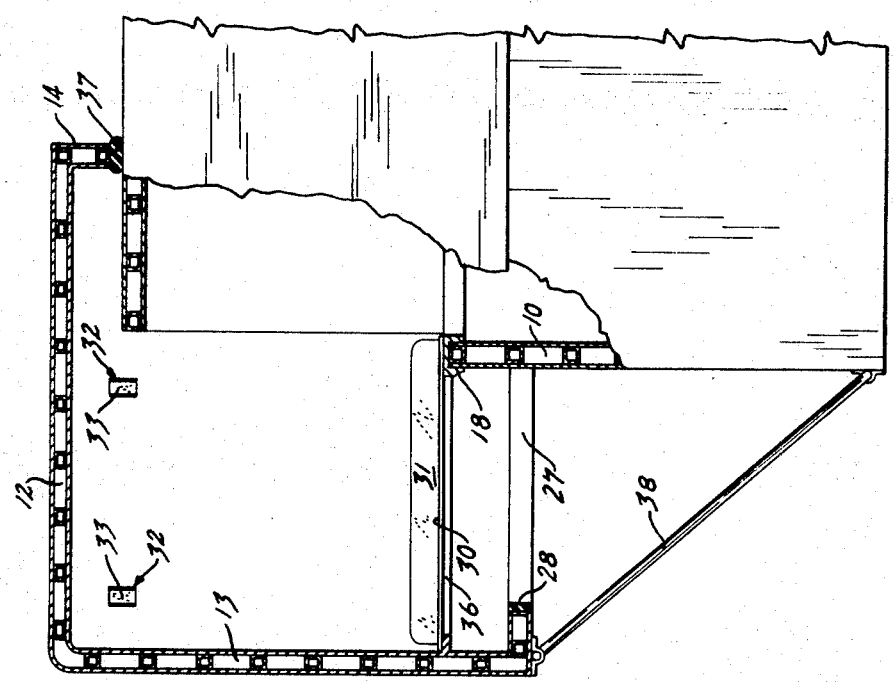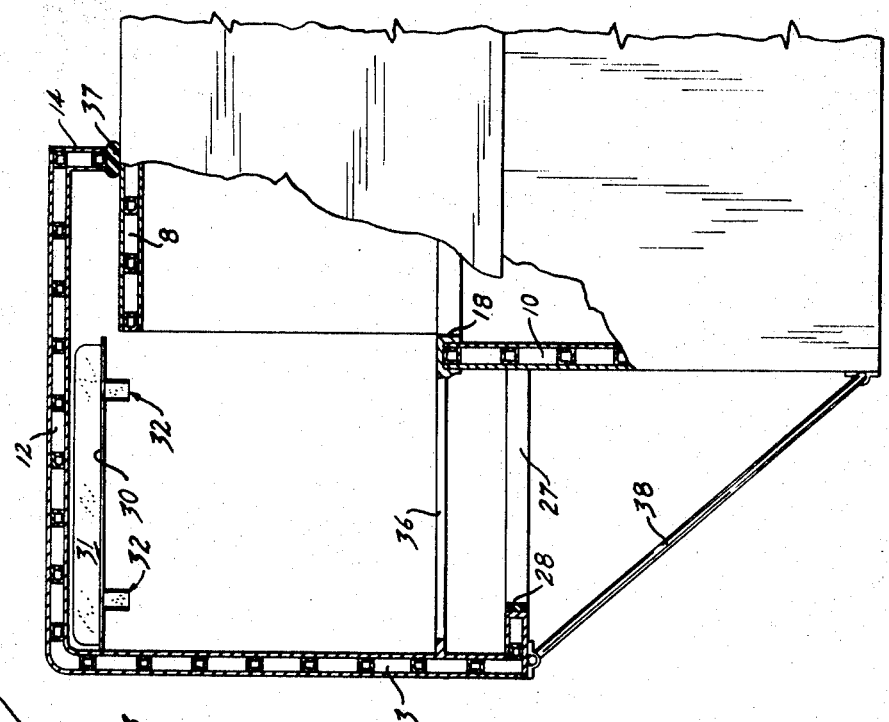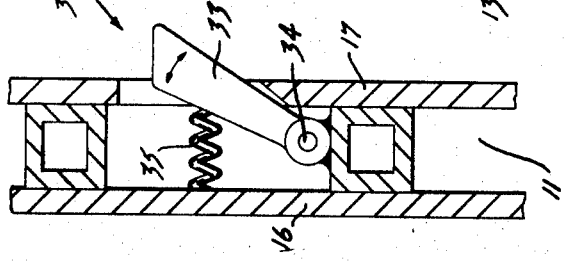

TELESCOPIC END SECTION FOR TELESCOPIC TRAVEL TRAILER

This is a continuation of application Ser. No. 68,071, filed Aug. 31, 1970.

BACKGROUND OF THE INVENTION

This invention relates to a telescopic travel trailer and more particularly to a telescopic travel trailer having telescopic end sections.

A telescopic travel trailer comprises a lower trailer section and an upper trailer section which telescopes vertically with respect to the lower section. The upper trailer section is adapted to be lowered to a retracted position for transporting and raised to an extended upper position for camping.

In the past, telescopic end sections have been utilized in conjunction with truck-mounted campers and non-telescopic travel trailers to provide additional bed space. With a camper, an end section is telescoped outwardly from within the camper to an extended position over the truck cab to form additional space generally used for a bed, while with a travel trailer, an end section, which extends the full height of the trailer, or only a partial height of the trailer, is telescoped from a retracted position, in which the end section is located within the trailer, to an extended position However, telescopic end sections have not been successfully incorporated with a vertically telescopic travel trailer for the retracted end sections, being located within the confines of the trailer, will normally interfere with vertical telescopic movement of the trailer sections.

SUMMARY OF THE INVENTION

This invention relates to a telescopic travel trailer having telescopic end sections. According to the invention, a telescopic end section is mounted on the open-ended upper trailer section and is disposed to telescope horizontally between a retracted inner position and an extended outer position. The telescopic end section encloses the open end of the upper trailer section when in retracted inner position and telescopes to the extended outer position to provide additional internal living space.

The upper surface of the telescopic end section is located in spaced relationship to the upper roof of the trailer section to form a storage chamber, and a shelf is horizontally positioned within the end section and can be moved vertically between an upper or storage position for traveling and a lower position where it is normally utilized as a bunk for camping.

A plurality of latch assemblies are connected to the upper portion of the end section and releasibly secure the shelf in the upper or storage position. With the shelf locked in the upper position, the end section can therefore be telescoped to the retracted inner position without interference with the shelf.

With the end section in the extended outer position, disengagement of the latch assemblies allows the shelf to descend to the lower position. When in the lower position, the shelf is supported by an inwardly projecting flange located on the telescopic end section and by a cap located on the upper portion of the lower trailer section. Engagement of the shelf with the flange and cap provides a seal for the lower open end of the section when in the extended outer position.

For camping, the movable shelf may be utilized as a bunk, or the extended end section can be used for additional storage space.

It is within the scope of this invention to either utilize only one telescopic end section or to utilize two telescopic end sections at each end of the travel trailer.

BRIEF DESCRIPTION OF THE DRAWINGS

The drawings furnished herewith illustrate the best mode presently contemplated by the inventor and clearly disclose the above advantages and features as well as others which will be readily understood from the detailed description thereof.

In the drawings:

FIG. 1 is a perspective view of a telescopic travel trailer having the upper trailer section in the extended upper position and showing one end section in the retracted inner position and one end section in the extended outer position;

FIG. 2 is a vertical section taken generally along lines 2—2 of FIG. 1 with parts broken away;

FIG. 3 is a detailed view of the spring-loaded latch assembly utilized to lock the shelf in the upper position;

FIG. 4 is a side elevational view of the rear portion of the trailer with parts broken away and showing the shelf in the upper storage position;

FIG. 5 is similar to FIG. 4, showing the shelf in the lower position; and

FIG. 6 is similar to FIG. 4, showing the end section in the retracted inner position.

DESCRIPTION OF THE PREFERRED ILLUSTRATED EMBODIMENT

The drawings illustrate a telescopic travel trailer 1 including a lower trailer section 2 which is mounted for travel on a pair of wheels 3. An upper trailer section 4 is supported for telescopic vertical movement with respect to the lower trailer section 2. During transportation, the upper trailer section 4 is lowered to a retracted position and can be raised to an extended or upper position for camping.

As shown in FIG. 1, the upper trailer section 4 is provided with a pair of end sections 5 and 6 which are mounted for horizontal, telescopic movement between a retracted inner position and an extended outer position. End section 5 is illustrated in FIG. 1 in the retracted inner position while end section 6 is illustrated in the extended outer position. Under normal operation, end sections 5 and 6 are positioned in the extended outer position for camping while positioned in the retracted inner position for traveling.

Since end sections 5 and 6 are identical in construction and operation, and since it is not imperative to utilize both end sections, only end section 6 will be described in detail.

As best shown in FIG. 2, upper trailer section 4 is open ended and consists of a pair of vertical sidewalls 7 joined by a horizontal ceiling or top wall 8. Lower trailer section 2 contains a pair of vertical sidewalls 9 spaced inwardly from vertical sidewalls 7 and are joined by end walls 10. End section 6 is formed by vertical sidewalls 11 spaced outward from sidewalls 7 and connected by a horizontal roof 12 which is spaced upwardly of ceiling 8. Sidewalls 11 and roof 12 are further joined by an outer end wall 13 and an inner end wall 14.

Sidewalls 7, 9 and 11, end walls 10, 13 and 14, and roofs 8 and 12 are fabricated from a series of reinforcing members 15 formed of tubular metal, wood or the like, and an outer skin 16 of metal, plastic or plywood is applied to the outer surfaces of the members 15, while an inner skin or layer 17, formed of plywood or the like, is secured to the inner surfaces of the members. Suitable insulation can be located in the walls between the spaced vertical and horizontal members 15.

A cap 18, formed of plastic or the like, is secured to the upper extremity of sidewalls 9 and end walls 10 of lower trailer section 2. When the upper trailer section 4 is in the raised or extended position, the inclined edge portion 19 of cap 18 bears against the resilient seal 20 which is mounted on the inner surface of the sidewall 7 of upper trailer section 4. The seal 20 is provided with a downwardly extending lip 21 which is secured between the outer skin 16 and the reinforcing members 15 of sidewall 7. The inclined edge 19 of cap 18 wedges against the seal 20, compressing the seal and providing an air-tight joint between the upper trailer section 4 and the lower trailer section 2.

To guide end section 6 in horizontal telescopic movement, a pair of guide wheels 22 and 23 are mounted for rotation on sidewall 11 and are adapted to ride on guide tracks 24 and 25 attached to the outer surface 26 of sidewall 7 of upper trailer section 4. As shown in FIG. 2, the upper guide wheel 22 has a vertical axis and rides in the upper channel shaped track 24, while the lower guide wheel has a horizontal axis and rides in the lower channel shaped track 25 which is displaced 90° from the upper track 24. Guide tracks 24 and 25 together with wheels 22 and 23 allow efficient and easy horizontal telescopic movement of end section 6 with respect to the upper trailer section 4.

The sidewalls 11 and end wall 13 of the telescopic end section 6 also have inwardly projecting flanges 27 which prevent or reduce the flow of dirt and debris between sidewalls 7 and 11. A resilient sealing strip 28 can be attached to the inner edge of flange 27 to provide a seal between the flange and the corresponding surface of the lower trailer section.

The roof 12 of end section 6 is spaced upwardly from horizontal roof 8 of upper trailer section 4 to define a storage chamber 29, when end section 6 is in the retracted inner position, as best shown in FIG. 6.

A shelf 30 is horizontally positioned in end section 6 and adapted to be vertically moved between an upper or storage position and a lower position. As shown in the drawings, the shelf 30 can support a mattress or bunk 31. Shelf 30 is locked in the upper position by a plurality of spring loaded latch assemblies 32. As specifically shown in FIG. 3, latch assemblies 32 are mounted on the sidewalls 11 of end section 6, and each assembly includes a latch 33 pivotally mounted by a pin 34 to the inner skin 17 of sidewall 11. A biasing spring 35 is attached to latch 33 and to the inner surface of outer skin 16 to outwardly bias latch assembly 32 to a latching position.

An inwardly projecting flange 36 is attached to the inner skins of sidewalls 11 and end wall 13 of end section 6 to support the edge of shelf 30 in the lower position. Flange 36 is positioned to be horizontally aligned with cap 18 when upper trailer section 4 is in the upper or extended position with respect to lower trailer section 2.

In operation, shelf 30 is vertically lowered to the lower position for camping and vertically raised to the upper position for storage. With specific reference to FIGS. 4 and 5, shelf 30 is released from the upper position by depressing latches 33. Shelf 30 is then allowed to descend to the lower or camping position in which it is supported by the inwardly projecting flange 36 and cap 18 which establish a sealed floor for end section 6 when in the extended outer position. Therefore, shelf 30 in the lower position prevents air and other extraneous matter from entering the trailer when in the camping position, as best shown in FIG. 5.

For storage, shelf 30 is manually raised to the upper position and secured by latch assemblies 32. Specifically, the shelf 30, as it is raised, will force latches 33 to pivot into sidewalls 11 thereby compressing spring 35. As shelf 30 rises above each latch 33, the biasing spring 35 will force latch 33 into a locking position thereby securing shelf 30 in the upper position for storage, as shown in FIG. 5.

With the shelf locked in the upper position, end section 6 can telescope inwardly with respect to upper trailer section 4. As the end section is retracted, shelf 30 and mattress 31 telescope with end section 6 into chamber 29 for storage in the retracted inner position. A resilient seal 37 is attached to the lower edge of end wall 14 to provide a slidable air-tight joint between end section 6 and the roof of upper trailer section 4. A latching member 39 and a latch receiving member 40 are connected to end sections 5 and 6. The members 39 and 40 are aligned for engagement to secure end section 5 to end section 6 when in the inner retracted positions.

The shelf 30 may be utilized to hold and position a variety of fixtures and articles frequently used when camping. The illustrated embodiment shows a mattress 31 positioned on shelf 30 which may be lowered to the lower position with shelf 30 to provide a bed when camping. Mattress 31 therefore rises to the upper position and similarly telescopes with shelf 30 into chamber 29 for storage.

Thus, to prepare for camping, upper trailer section 4 is raised to an extended position with respect to lower trailer section 2. End section 6 is horizontally telescoped to an extended outer position and suitable brace supports 38 are connected between outer wall 13 of end section 6 and end wall 10 of lower trailer section 2. Latch assemblies 32 are disengaged to permit shelf 30 with mattress 31 to descend to the lower position, thereby providing a bed and further sealing the bottom portion of end section 6.

To prepare for transportation, shelf 30 with mattress 31 is raised to the upper or storage position and secured by latch assemblies 32. Brace supports 38 are disconnected from end section 6 and lower trailer section 2. End section 6 is therefore horizontally telescoped to the retracted inner position which telescopes shelf 30 and mattress 31 into chamber 29 and seals the open end of upper trailer section 4.

The present invention thus provides additional trailer space by utilizing telescoping end section which may be readily telescoped horizontally to inner retracted position for traveling without interferring with the normal vertical telescopic movement of the upper trailer section.

Various modes of carrying out the invention are contemplated as being within the scope of the following claims, particularly pointing out and distinctly claiming the subject matter which is regarded as the invention.

I claim:

1. A telescopic travel trailer, comprising
a lower trailer section,
an upper trailer section having at least one open end and disposed to telescope vertically with respect to the lower trailer section from a retracted lower position to an extended upper position,
a telescopic end section mounted on said upper trailer section and disposed to telescope horizontally with respect to said upper trailer section from a retracted inner position to an extended outer position, the upper surface of said end section disposed in spaced relation to the upper surface of said upper trailer section to define a storage chamber, and
a shelf horizontally positioned and disposed fro vertical movement within said telescopic end section and movable between a lower position for camping and an upper storage position, said upper storage position being above the level of the upper surface of the upper trailer section whereby said shelf will move into the storage chamber when said end section is telescoped to the retracted inner position.

2. The trailer of claim 1 and including support means to support said shelf in the lower position.

3. The trailer of claim 2, wherein said support means comprises a ledge attached to the lower portion of said end section and extending substantially continuously through-out the extent of the end section to provide a seal between the shelf and the end section.

4. The trailer of claim 1, and including a plurality of latch assemblies connected to the upper portion of said end section and disposed to releasably lock said shelf in the upper position.

5. The trailer of claim 1, wherein said upper trailer section includes a ceiling and said end section includes a pair of sidewalls, a roof, an outer end wall and an inner end wall, said ceiling of the upper trailer section roof and said roof, sidewalls and end walls of said end section defining the storage chamber capable of receiving said shelf.

6. The trailer of claim 1, wherein
said lower trailer section includes an end wall, and a cap mounted on the upper portion of said end wall, and
said end section includes an inwardly projecting flange in approximate horizontal alignment with said cap when said upper trailer section is in extended upper position, said flange and said cap providing support for said shelf in the lower position.

7. The trailer of claim 1, and including a guide means interconnecting said end section and said upper trailer section for guiding said end section for horizontal telescopic movement.

8. The trailer of claim 1, and including means connected to seal said end section to said upper and lower trailer sections when said end section is in the retracted inner position.

9. The trailer of claim 1, and including brace means interconnecting said end section and said lower trailer section to provide stability for said end section when in extended outer position and when said upper trailer section is in extended upper position.

10. The trailer of claim 1, and including a mattress supported on said shelf, said storage chamber having a sufficient height to receive the shelf and the mattress.

11. A telescopic travel trailer, comprising
a lower trailer section,
an open-ended upper trailer section disposed to telescope vertically with respect to the lower trailer section from a retracted lower position to an extended upper position, said upper trailer section including a pair of sidewalls and a top wall connecting the sidewalls together,
a telescopic end section mounted on said upper trailer section and disposed to telescope horizontally with respect to said upper trailer section from a retracted inner position to an extended outer position, said end section including a pair of sidewalls, an outer end wall, an inner end wall and a roof connecting said sidewalls and said end walls, said inner end wall being located above the top wall of the upper trailer section and said roof being disposed in spaced relation to the top wall of said upper trailer section to define a storage chamber,
a shelf horizontally positioned and disposed for vertical movement within said telescopic end section and movable between a lower position for camping and an upper storage position located above the level of said top wall, said shelf moving into the storage chamber when in the upper position as said end section is telescoped to the retracted inner position,
latch means for releasably latching the shelf in the upper storage position,
support means for supporting the shelf in the lower position,
first sealing means associated with the lower edge of the inner end wall of said end section for providing a sliding seal between said lower edge and the top wall of the upper trailer section, and
second sealing means for sealing the joint between the lower extremities of the sidewalls and the outer end wall of the end section and the lower trailer section when the end section is in the retracted position.

* * * * *